(12) United States Patent
Kikuchi et al.

(10) Patent No.: US 6,377,948 B2
(45) Date of Patent: Apr. 23, 2002

(54) DIRECTORY ACCESS METHOD

(75) Inventors: Satoshi Kikuchi; Yoko Hirashima; Yusuke Matsuoka, all of Yokohama; Michiyasu Odaki, Yamato; Kazuo Ishikawa, Isehara, all of (JP)

(73) Assignees: Hitachi, Ltd., Tokyo; Hitachi Software Engineering Co., Ltd., Yokohama, both of (JP)

( * ) Notice: Subject to any disclaimer, the term of this patent is extended or adjusted under 35 U.S.C. 154(b) by 0 days.

(21) Appl. No.: 09/153,874

(22) Filed: Sep. 16, 1998

(30) Foreign Application Priority Data

Sep. 19, 1997 (JP) .............................. 9-254877

(51) Int. Cl.[7] .......................... G06F 17/30; G06F 9/00; G06F 15/16

(52) U.S. Cl. ............................. 707/10; 707/3; 707/2; 709/101; 709/201; 709/217; 709/219

(58) Field of Search ........................... 707/1, 201, 203, 707/104, 8, 10, 2, 3; 709/101, 201, 217, 219; 714/19, 20

(56) References Cited

U.S. PATENT DOCUMENTS

| | | | | |
|---|---|---|---|---|
| 4,868,744 A | * | 9/1989 | Reinsch et al. | 714/19 |
| 5,077,658 A | * | 12/1991 | Bendert et al. | 707/1 |
| 5,220,665 A | * | 6/1993 | Coyle, Jr. et al. | 709/101 |
| 5,758,343 A | * | 5/1998 | Vigil et al. | 707/10 |
| 5,862,318 A | * | 1/1999 | Habben | 714/20 |
| 6,058,388 A | * | 5/2000 | Molloy | 707/1 |

OTHER PUBLICATIONS

Cole, Vendors Set to Give LDAP Directories a Boost, Computer World, pp. 53–54, Jan. 1997.*

Soft Switch Directory Publisher, Web to X.500 Gateway Administrator's Guide, Version 1.0 1609–2B, Odd pp. 1–77, Feb. 1997.*

Hodges, LDAP & X.500: Road Map & FAQ, Distributed Computing and Communication Services Stanford University, Printed pp. 1–8, Mar. 1997.*

Wahl et al., Lightweight Directory Access Protocol (V3), RFC 2251, pp. 1–42, Dec. 1997.*

Severance, Could LDAP be the Next Killer DAP?, IEEE, Computer vol. 30, Issue 8, pp. 88–89, Aug. 1998.*

* cited by examiner

Primary Examiner—Thomas Black
Assistant Examiner—Frantz Coby
(74) Attorney, Agent, or Firm—Antonelli, Terry, Stout & Kraus, LLP

(57) ABSTRACT

A network system includes a directory server having a database for storing directory information, and at least one client connected to the directory server through a network. The client issues statements for defining a transaction. The directory server includes a non-transaction processing unit for processing each of access requests from the client as a different transaction, a transaction processing unit for processing a sequence of access requests from the client as a single transaction, a phase management table for storing a connected client and a processing phase for an access request, and a phase management unit for determining whether an access request from a connected client is defined as a transaction, storing a processing phase in the phase management table, and passing the access request from the client to the non-transaction processing unit or to the transaction processing unit based on the stored processing phase.

14 Claims, 16 Drawing Sheets

PHASE MANAGEMENT TABLE

FIG.15
PRIOR ART

```
—SEARCH(Search)—                                                    ⟋24
    SearchRequest : := [APPLICATION 3] SEQUENCE {
        baseObjec LDAPDN,
        scope ENUMERATED {
                        baseObjec (0),
                        singleLevel (1),
                        wholeSubtree (2) },
        derefAliases ENUMERATED {
                        neverDerefALiases (0),
                        derefInSearching (1),
                        derefFindingBaseObj (2),
                        derefAlways (3) },
        sizeLimit INTEGER (0 .. maxInt),
        timeLimit INTEGER (0 .. maxInt),
        attrsOnly BOOLEAN,
        filter Filter,
        attributes SEQUENCE OF AttributeType }
—ADD ENTRY (Add)—                                                   ⟋25
    AddRequest : := [APPLICATION 8] SEQUENCE {
        entry LDAPDN
        attrs SEQUENCE OF SEQUENCE {
            type AttributeType,
            values SET OF AttributeValue }}
—DELETE ENTRY (Delete)—                                             ⟋26
    DelRequest : := [APPLICATION 10] LDAPDN
—MODIFY ENTRY (Modify)—                                             ⟋27
    ModifyRequest : := [APPLICATION 6] SEQUENCE {
        object LDAPDN,
        modification SEQUENCE OF SEQUENCE {
            operation ENUMERATED {
                        add (0),
                        delete (1),
                        replace (2) },
            modification SEQUENCE {
                type AttributeType,
                values SET OF AttributeValue } } }
```

FIG.16
PRIOR ART

```
— EXTENDED OPERATION (Extended)—                              28
    ExtendedRequest : := [APPLICATION 23] SEQUENCE {
        requestName    [0] LDAPOID,
        requestValue   [1] OCTET STRING OPTIONAL }
```

FIG.17

```
—      BEGIN TRANSACTION (begin)  —                           29
    ExtendedRequest : := [APPLICATION 23] SEQUENCE {
        requestName      [0] <beginOid>,
        requestValue     [1] <exclusiveModeOid> }
— COMMIT (commit)—                                            30
    ExtendedRequest : := [APPLICATION 23] SEQUENCE {
        requestName      [0] <commitOid> }
— ROLLBACK (rollback)—                                        31
    ExtendedRequest : := [APPLICATION 23] SEQUENCE {
        requestName      [0] <rollbackOid> }
```

DIRECTORY ACCESS METHOD

BACKGROUND OF THE INVENTION

1. Field of the Invention

The present invention relates to a method of reliably accessing data on a directory server in a network.

2. Description of the Related Art

Electronic mail systems are becoming more and more popular as means for realizing smooth communications within an enterprise and between enterprises by transmitting and receiving documents created on information processing apparatus such as personal computers (PC), workstations (WS) and so on through a network such as LAN (Local Area Network).

A current electronic mail system uses a unique identifier referred to as a "mail address" as the mail destination for each user. A user is assumed to know the mail address of a recipient before transmitting a mail, so that when the user sends a mail to a certain person for the first time, the user should inquire the person for his or her mail address beforehand by an appropriate means such as a telephone, thus involving an extra effort.

As a means for solving the problem mentioned above, a directory service has been provided as represented by X.500 (ISO9594) which is a recommendation of CCITT, or the like. The directory service may be utilized as an electronic address book in an electronic mail system.

A directory service conforming to X.500 has a data model which is hierarchically managed as a tree structure (directory tree). A directory entry is located at a position corresponding to a leaf of the tree. Each entry is uniquely identified by a name including hierarchical information (DN: Distinguished Name), and can store, in addition to a mail address of a user, various information such as full name, telephone number, FAX number, picture and so on of the user as attributes.

In addition, X.500 employs a client-server type distributed system architecture, and defines DAP (Directory Access Protocol) which complies with a seven-layer structure of OSI (Open Systems Interconnection) as a communication protocol between information processing units serving as clients and a server.

On the other hand, the IETF (Internet Engineering Task Force), which is a standardization organization in the Internet, has standardized "LDAP: Lightweight Directory Access Protocol (RFC1777)" as a protocol between clients and a server on TCP/IP. This protocol is also described in "Lightweight Directory Access Protocol (V3)", M. Wahl et al. RFC2251, December 1997. The user may access a directory server of X.500 from an application program (hereinafter abbreviated as "AP") on a client through a network such as LAN, in accordance with LDAP, for searching for desired information such as the mail address of a user or the like.

FIG. 15 shows a part of an LDAP access request defined as RFC1777, which is described using ASN.1 (Abstract Syntax Notation One) defined as ISO8824.

Referring specifically to FIG. 15, Search 24 is a request for searching directory entries; Add 25 is a request for adding an entry; Delete 26 is a request for deleting an entry; and Modify 27 is a request for changing an attribute value in an entry. Other than the requests shown in FIG. 15, various access requests have been defined by RFC1777 as protocol elements, including Bind for starting a connection, Unbind for closing a connection, ModifyRDN for changing the name of an entry, Compare for comparing a certain attribute value between entries, and so on.

The directory server receives the access requests shown in FIG. 15, issued by a client, and access a database (hereinafter abbreviated as DB) which stores information on each directory entry. When an access request involves a search operation such as Search 24 or the like, the directory server searches the DB for an entry or entries meeting specified conditions, extracts the entry or entries from the DB, and returns the extracted entry or entries to the client. On the other hand, when an access request involves a modify operation such as Add 25, Delete 26, Modify 27 or the like, the directory server modifies associated directory information on the DB and returns the result to the client.

According to the conventional directory access method mentioned above, when the directory server receives a modify request, the directory server modifies associated directory information on the DB and simultaneously validates the modified information, so that the following problems arise.

For example, assume that the processing is suddenly interrupted due to power interruption, user's erroneous manipulations, or erroneous operations of the information processing unit itself or a program, while an AP is successively updating a plurality of directory information items. Within a sequence of directory information items in course of the modification, only those which have reached the directory server are reflected to the DB.

A similar problem may also arise by an interruption of a work by the user. Specifically, when a sequence of meaningful processing is interrupted, the directory information looses the consistency, and it is difficult to eliminate the inconsistency once introduced into the DB. In addition, the conventional method only has a poor exclusive control capability.

SUMMARY OF THE INVENTION

It is therefore an object of the present invention to provide a directory access method which is capable of guaranteeing the consistency of directory information even if an inadvertent interruption due to a fault in a system or the like, an intended interruption made by a user or an AP, or the like occurs during the execution of a sequence of directory operations, or during simultaneous accesses from a plurality of APs.

To achieve the above object, the directory access method according to the present invention collectively processes a sequence of meaningful access requests as a logical work unit (transaction). According to a directory service implementing the directory access method of the present invention, a client issues an access request to a directory server either in a non-transaction phase or in a transaction phase. In the non-transaction phase, issued access requests are individually reflected to a database as before. The non-transaction phase thus provides the compatibility with conventional systems. In the transaction phase, on the other hand, a sequence of issued access requests are collectively reflected to the database as a single transaction. The client can bidirectionally transit between both the phases in accordance with the contents of processing. When the client transits to the transaction phase and issues a sequence of access requests, the consistency is guaranteed for a plurality of directory information items to be processed by the access requests.

To implement the directory access method according to the present invention, a directory server comprises a database for storing directory information; a non-transaction unit for processing individual access requests as different transactions; a transaction processing unit for processing a sequence of access requests as a single transaction; a phase management table for storing a processing phase for each connection with a client; and a phase management unit for passing a received access request to the non-transaction processing unit or to the transaction processing unit based on a stored processing phase.

In addition, the client is provided with a request for the directory server for defining transaction processing.

BRIEF DESCRIPTION OF THE DRAWINGS

FIG. 15 is a list for explaining communication protocol elements related to search and modify;

FIG. 16 is a list for explaining a communication protocol element related to an extended operation;

FIG. 17 is a list for explaining communication protocol elements related to a transaction operation;

Figure 1:
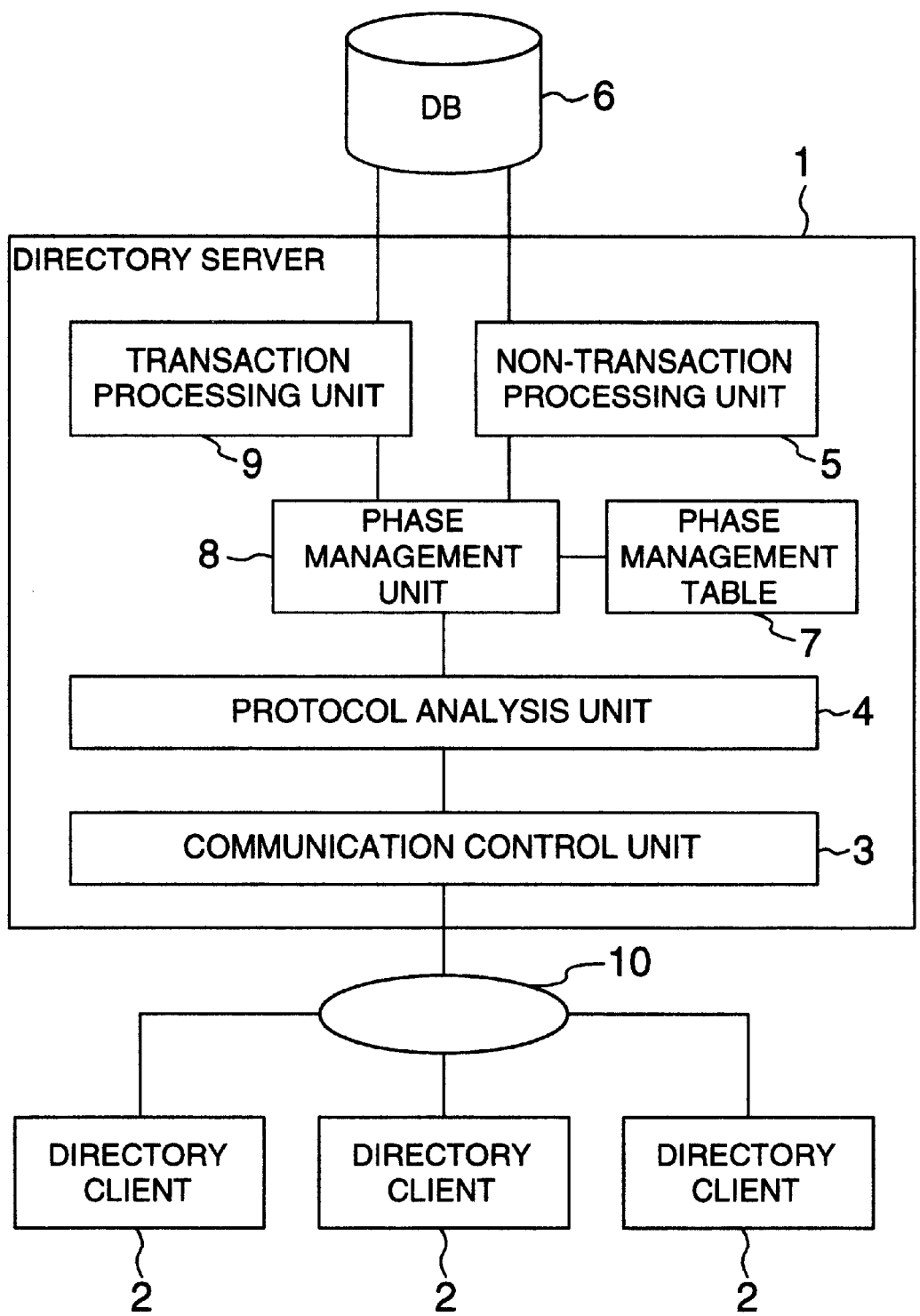
FIG. 1 is a block diagram illustrating the configuration of a system according to the present invention.

DESCRIPTION OF THE PREFERRED EMBODIMENTS (1) First Embodiment

A first embodiment of the present invention will hereinafter be described with reference to the accompanying drawings. In the following, the same parts in various figures are designated the same reference numerals.

FIG. 1 illustrates an exemplary configuration of a system in which a directory server 1 and a plurality of clients 2 are connected through a network 10 such as LAN. The directory server 1 is connected to a DB 6 as a means for storing and managing directory information.

The directory server 1 comprises a communication control unit 3 for executing communication processing with the clients 2; a protocol analysis unit 4 for receiving a request for accessing directory information and analyzing the contents of the access request; a non-transaction processing unit 5 for processing individual access requests as different transactions as before; a transaction processing unit 9 for processing a sequence of access requests as a single transaction; a phase management table 7 for storing a processing phase for each connection with a client 2; and a phase management unit 8 for passing an received access request to the non-transaction processing unit 5 or to the transaction processing unit 9 based on the processing phase.

The directory server 1 may be implemented by a personal computer or a workstation which has a CPU (processor), a memory and a communication port. The above-mentioned units may be in the form of software executed by the CPU, and the table is placed on the memory (described later in greater detail).

The DB 6 may be, for example, a DB management system having transaction capabilities such as a relational DB management system, an object-oriented DB management system and so on available on the market, for storing and managing information on each directory entry. The directory server 1 and the DB 6 often share the same hardware portions, and transmit and receive information therebetween through a means such as interprocess communication. The DB 6 is not limited to a DB management system as mentioned above but may be a DB package including index and search functions such as hash, B-tree and so on. As representative DB packages, dbm of UNIX, Berkeley DB and so on may be presented. Since such a DB package operates as a portion of an AP, the directory server 1 may access the DB 6 using a means such as a function call instead of the interprocess communication.

In the following, the first embodiment is explained in connection with a relational DB management system for managing data in the form of a table composed of rows and columns, as an example of the DB 6.

Generally, a relational database language (SQL) is utilized for accesses to a relational DB management system. The SQL has a SELECT statement for searching a table; an INSERT statement for adding a new row to the table; a DELETE statement for deleting a row in the table; a MODIFY statement for updating a row in the table; a COMMIT statement for validating all modify operations so far executed and terminating a transaction; a ROLLBACK statement for invalidating all modify operations so far executed and terminating a transaction; and so on.

A relational DB management system implicitly begins a transaction at the time a client is connected to the system, and treats a sequence of SQL statements until a COMMIT or ROLLBACK statement is issued as a single transaction. When a COMMIT or ROLLBACK statement is issued, subsequent SQL statements are treated as a new transaction.

Also, general-purpose relational DB management systems often include a lock function for a table or a row involved in a current operation. Generally, when a SELECT statement is used to search a table, a shared lock is applied to rows which meet conditions for the search. Rows, which are once shared locked, cannot be modified from other APs, but can be searched for. On the other hand, when a modify operation is executed through an INSERT statement or the like, a row to be modified is applied with an exclusive lock. An exclusively locked row cannot be searched or modified from other APs. It is also possible to explicitly specify which of shared lock or exclusive lock should be applied to a row to be accessed. When not specified, a shared lock is applied to rows associated with a search operation, while an exclusive lock is applied to rows associated with a modify operation, as mentioned above. Each lock is released when an associated transaction is terminated.

Figure 2:
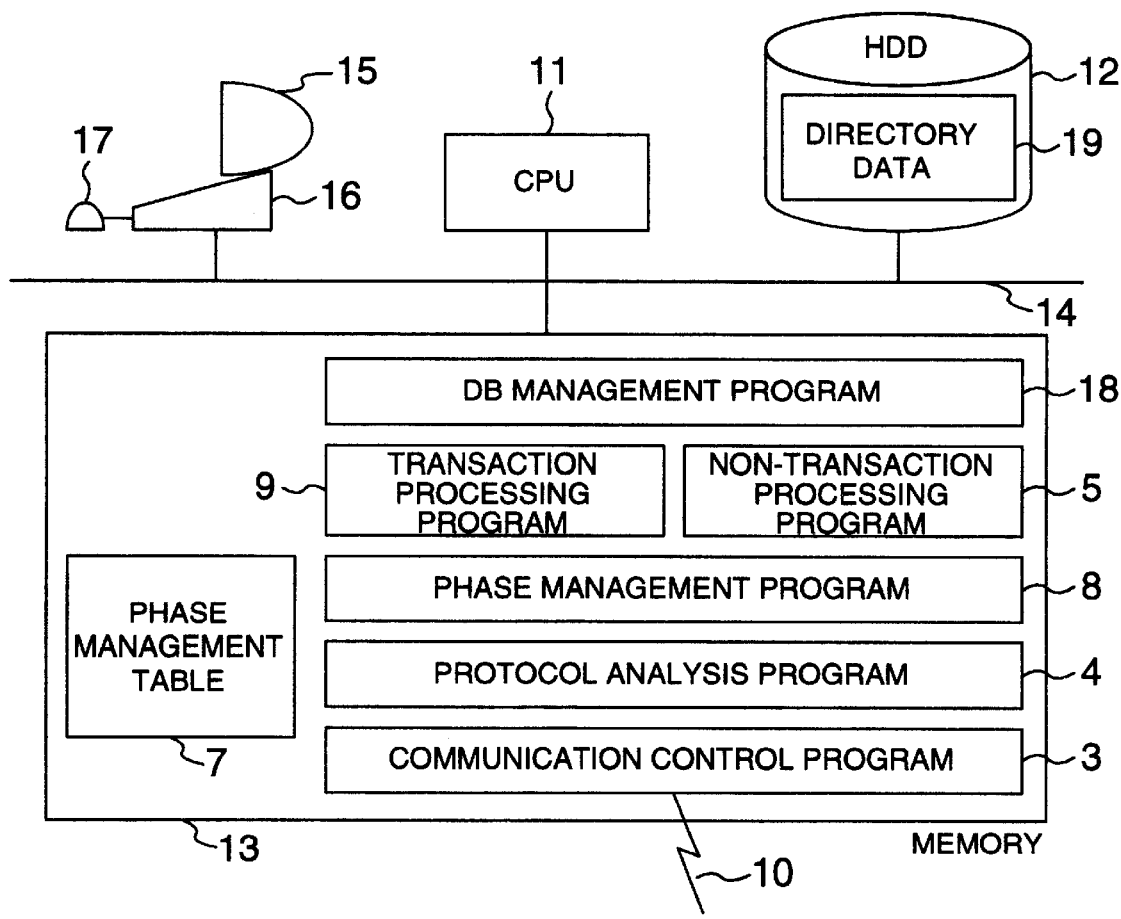
FIG. 2 is a block diagram illustrating the configuration of a directory server according to the present invention.

FIG. 2 illustrates the configuration of the directory server 1 according to the first embodiment. Parts in FIG. 2 substantially identical to those in FIG. 1 are designated the same reference numerals.

The directory server 1 comprises a central processing unit (CPU) 11; a magnetic disk 12 such as a hard disk drive; a main memory 13; a bus 14; a display 15; a keyboard 16; and a pointing device 17 such as a mouse. The magnetic disk 12 stores directory data 19 as a file. The main memory 16 stores a communication control program 3; a protocol analysis program 4; a phase management program 8; a non-transaction processing program 5; a transaction processing program 9; and DB management program 18. These programs are originally stored in the magnetic disk 12 and transferred to the main memory 16 as required and executed by the CPU 14. The main memory 16 further stores the phase management table 7. The DB 6 in FIG. 1 is composed of the DB management program 18 and the directory data 19.

Next explained is a request made by a user (directory client 2) to the directory server 1 in the directory access method according to the present invention, taking the LDAP as an example.

FIG. 16 shows a notation of an access request Extended 28 for an extended operation defined in the LDAP. Extended 28 is a request provided to allow a vendor or the like to individually extend functions, and has two parameters: requestName and requestValue. The requestName is loaded with a globally unique object identifier (OID) described in X.208 Recommendation of CCITT for uniquely identifying an extended function. The requestValue in turn is loaded with various values individually used by the extended function as an octet string. The requestValue is an option, and thus may not be loaded with any value if not required.

FIG. 17 shows an access request provided for a client in the directory access method of the first embodiment. The directory access method of the first embodiment implements, in addition to conventional requests, three functions using Extended 28 shown in FIG. 16. The three functions are begin 29 for indicating the beginning of a transaction; commit 30 for validating all operations so far executed and terminating a transaction; and rollback 31 for invalidating all operations so far executed and terminating a transaction. In FIG. 17, <begin0id>, <commit0id>, <rollback0id>, <exclusiveMode0id> are each loaded with a numerical string as an object identifier assigned to identify their respective functions. The <exclusiveMode0id> in begin 29 is used to identify two types of exclusive modes, later described.

Figure 10:
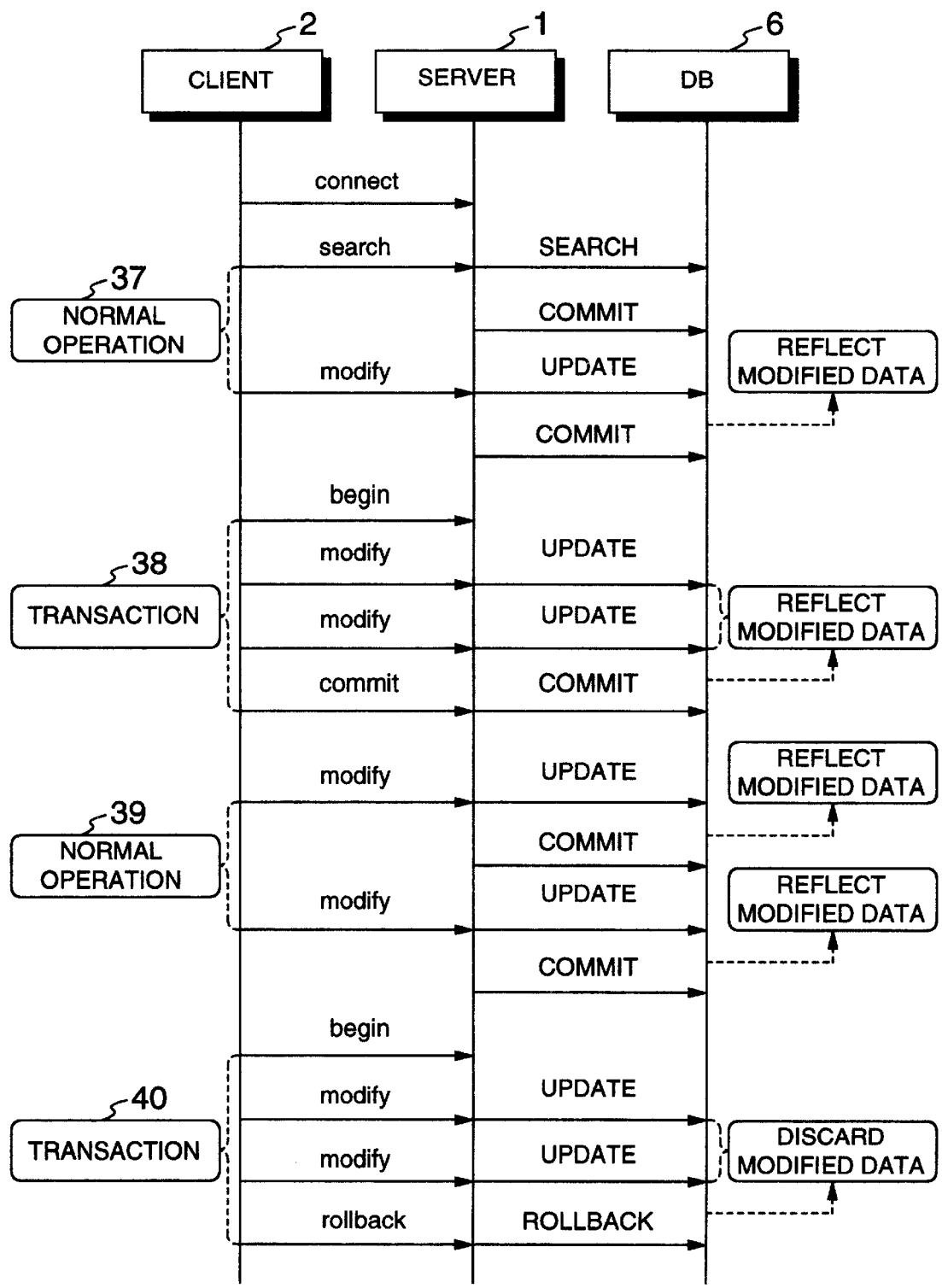
FIG. 10 is a diagram for explaining a basic communication sequence in the first and second embodiments.

FIG. 10 illustrates a basic communication sequence which shows, as an example, an alternation of a conventional directory access method (37, 39) and the directory access method (38, 40) of the present invention.

First, as a first phase, a client 2, after connecting to the directory server 1, issues search and modify requests. Since the server 1 has not received begin 29 for indicating the beginning of a transaction, the server 1 treats these requests as a normal operation 37 of a non-transaction phase. Specifically, the server 1 issues an SQL statement corresponding to each statement and a COMMIT statement to the DB 6, and validates data simultaneously with modification associated with each request.

Next, as a second phase, the client 2 issues begin 29 for indicating the beginning of a transaction, and then issues a plurality of modify requests. The server 1 receives begin 29, recognizes the modify requests subsequent thereto as an operation 38 in a transaction phase, and issues an SQL statement corresponding to each modify request to the DB 6. When the client 2 issues commit 30 for indicating a normal termination of the transaction at the end of the transaction phase 38, the server 1 issues a COMMIT statement to the DB 6 to validate a sequence of modified data in the transaction 38.

Further, as a third phase, when the client 2 issues a plurality of modify requests, the server 1 treats these modify requests as a normal operation 39 in a non-transaction phase, issues an SQL statement corresponding to each request and a COMMIT statement to the DB 6, and validates data simultaneously with modification associated with each request.

Finally, as a fourth phase, when the client 2 issues a plurality of modify requests after issuing begin 29 for indicating the beginning of a transaction, the server 1 recognizes these modify requests as an operation 40 in a transaction phase, and issues an SQL statement corresponding to each modify request to the DB 6. When the client 2 issues rollback 31 for indicating an abnormal termination of the transaction at the end of the transaction phase 40, the server 1 issues a ROLLBACK statement to the DB 6 to force the client 2 to discard a sequence of modified data in the transaction 40.

As described above, the AP on the client 2 can bidirectionally transit between the non-transaction phase and the transaction phase by explicitly issuing begin 29, and commit 30 or rollback 31. The server 1 treats at least one or more requests received between begin 29 and commit 30 or rollback 31, within all access requests, as a single transaction, and individually processes the remaining access requests as before.

Figure 11:
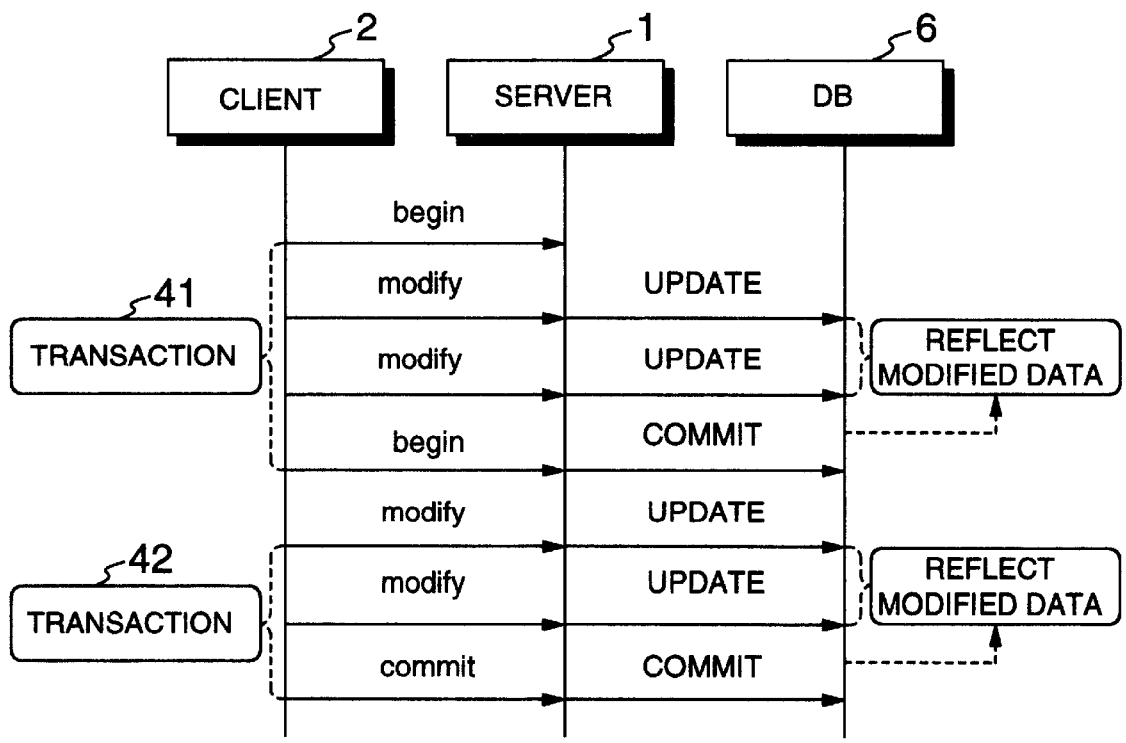
FIG. 11 is a diagram for explaining a communication sequence for successive transactions in the first and second embodiments.

In an alternative, there may be a case where a plurality of transaction operations be desirably executed in succession, rather than alternately repeating a non-transaction operation and a transaction operation as described above. A communication sequence for this case is illustrated in FIG. 11.

The client 2 issues begin 29 for indicating the beginning of a transaction, and then issues a plurality of modify requests. The server 1 receives begin 29, recognizes the modify requests subsequent thereto as an operation 41 in a transaction phase, and issues an SQL statement corresponding to each modify request to the DB 6. When the client 2 issues begin 29 for indicating the beginning of a transaction at the end of the transaction phase 41, the server 1 recognizes the beginning of a new transaction, validates a sequence of modified data in the transaction 41 by issuing a COMMIT statement to the DB 6, and subsequently transits to a new transaction phase 42.

As described above, begin 29 serves not only as a normal termination indication for a current transaction but also as a indication for the beginning of the next transaction, when issued during a transaction phase.

Figure 13:
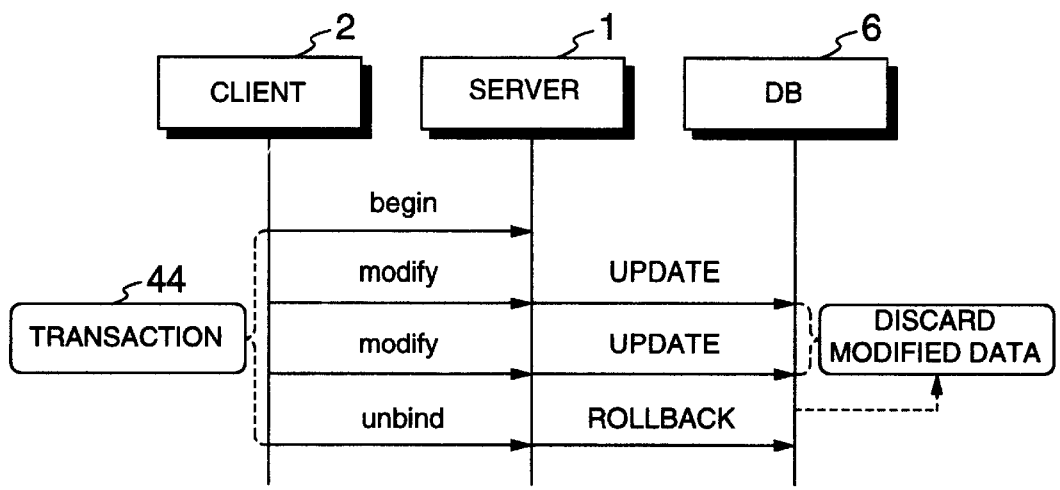
FIG. 13 is a diagram for explaining a communication sequence when a connection is closed in the first and second embodiments.

On the other hand, if the client 2 fails during a transaction, the server 1 or the DB 6, which may detect the failure by a means such as time monitoring using a timer or the like, discards directory information modified during the transaction, and restores information in the DB 6 to the state before the transaction. Also, as illustrated in FIG. 13, when the server 1 receives unbind which is an access request for closing a connection with the directory service during a transaction 44, the server 1 similarly issues a ROLLBACK statement to the DB 6 to discard a sequence of modified data during the transaction 44, and restore information in the DB 6 to the state before the transaction 44.

Next, a lock function during a transaction will be explained.

As mentioned above, general-purpose relational DB management systems often include a lock function for a table or a row which is being operated. For example, when an AP attempts to access data previously locked by another AP, it is also possible to specify, at the time of issuing an SQL statement, whether the AP is placed into a wait state until the data is released from the locking or an exclusive error is immediately returned.

The directory access method of the first embodiment, thus, utilizes the lock function provided in the DB 6 to implement the following two types of exclusive modes during a transaction.

The operation of a WAIT mode, i.e., a first exclusive mode (FIG. 8) and the operation of a NOWAIT mode, i.e., a second exclusive mode (FIG. 9) will be explained below with a specific example in which the server 1 is accessed simultaneously by an AP 46 on a client attempting to modify a directory entry B as a non-transaction, similarly to the prior art, and an AP 45 on another client attempting to modify entries A and B as a transaction.

Figure 8:
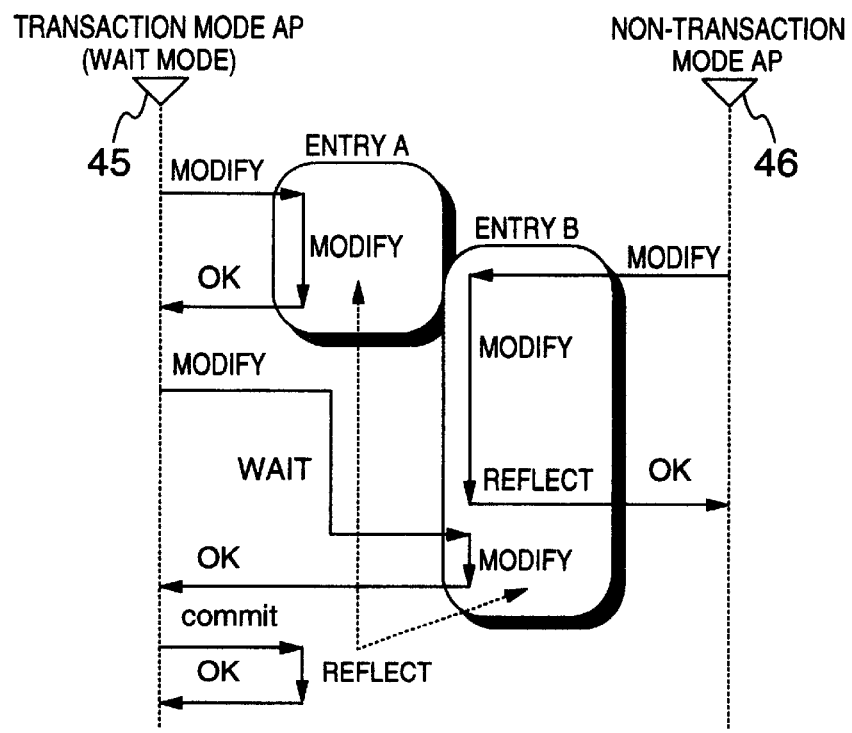
FIG. 8 is a diagram for explaining a transaction operation in a WAIT mode in the first and second embodiments.

First, the operation in the WAIT mode is shown with reference to FIG. 8. The WAIT mode brings an AP into a wait state when a directory entry accessed by the AP has been locked by another AP.

The AP 45 issues begin 29 having an object identifier, as a parameter, assigned to the WAIT mode in the form of <exclusiveMode0id>, and then modifies an entry A. Subsequently, when the AP 45 attempts to modify an entry B, the AP 45 is brought into a processing wait state since the entry B is being modified by an AP 46. The request issued by the AP 45 to modify the entry B is executed after the AP 46 has completed the modification to the entry B.

Figure 9:
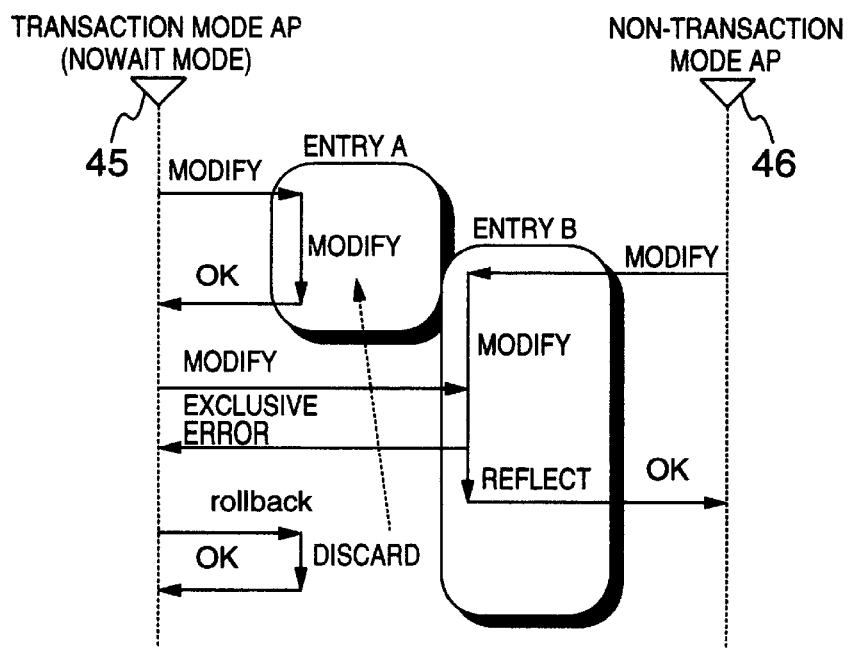
FIG. 9 is a diagram for explaining a transaction operation in a NOWAIT mode in the first embodiment.
Figure 12:
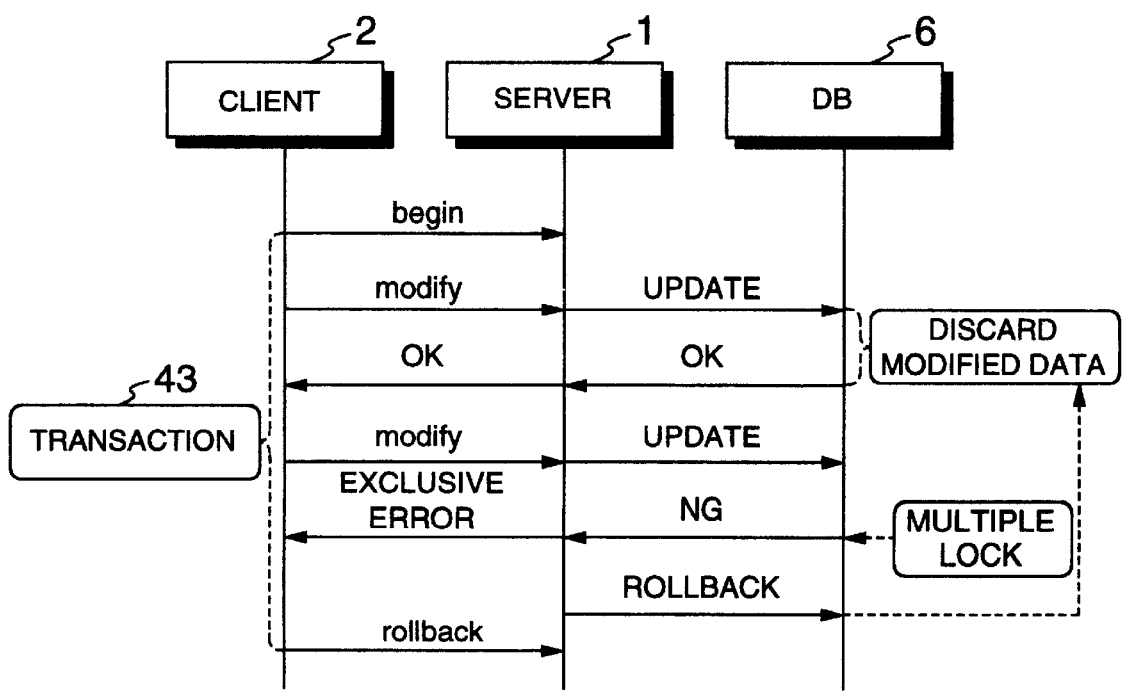
FIG. 12 is a diagram for explaining a communication sequence when an exclusive error occurs in the first embodiment.

Next, the operation in the NOWAIT mode is shown with reference to FIG. 9. The NOWAIT mode returns the control to an AP as an exclusive error when a directory entry accessed by the AP has been locked by another AP. FIG. 12 illustrates a communication sequence of a transaction operation in the NOWAIT mode.

In FIG. 9, the AP 45 issues begin 29 having an object identifier, as a parameter, assigned to the NOWAIT mode in the form of <exclusiveMode0id>, and then modifies an entry A. Subsequently, when the AP 45 attempts to modify an entry B, an exclusive error is returned as an error code, and the control is returned to the AP 45 since the entry B is being modified by the AP 46. As illustrated in FIG. 12, information on the entry A modified by the AP 45 during a transaction 43 is implicitly discarded at this time. The AP 45, upon detecting the exclusive error, explicitly issues rollback 31 for indicating an abnormal termination of the transaction to the server 1.

The transaction operation in the WAIT mode illustrated in FIG. 8 can be processed without taking into account whether or not an directory entry to be accessed has been locked by another AP, so that the AP can be simplified. However, if a plurality of APs modify a plurality of entries in the opposite order, a dead lock phenomenon is likely to occur. In contract, the transaction operation in the NOWAIT mode illustrated in FIG. 9, although requiring the processing for the exclusive error, is free from the possibility of dead lock. The directory access method according to the first embodiment enables an AP to select the exclusive mode during a transaction operation depending on particular applications or the like.

Figure 14:
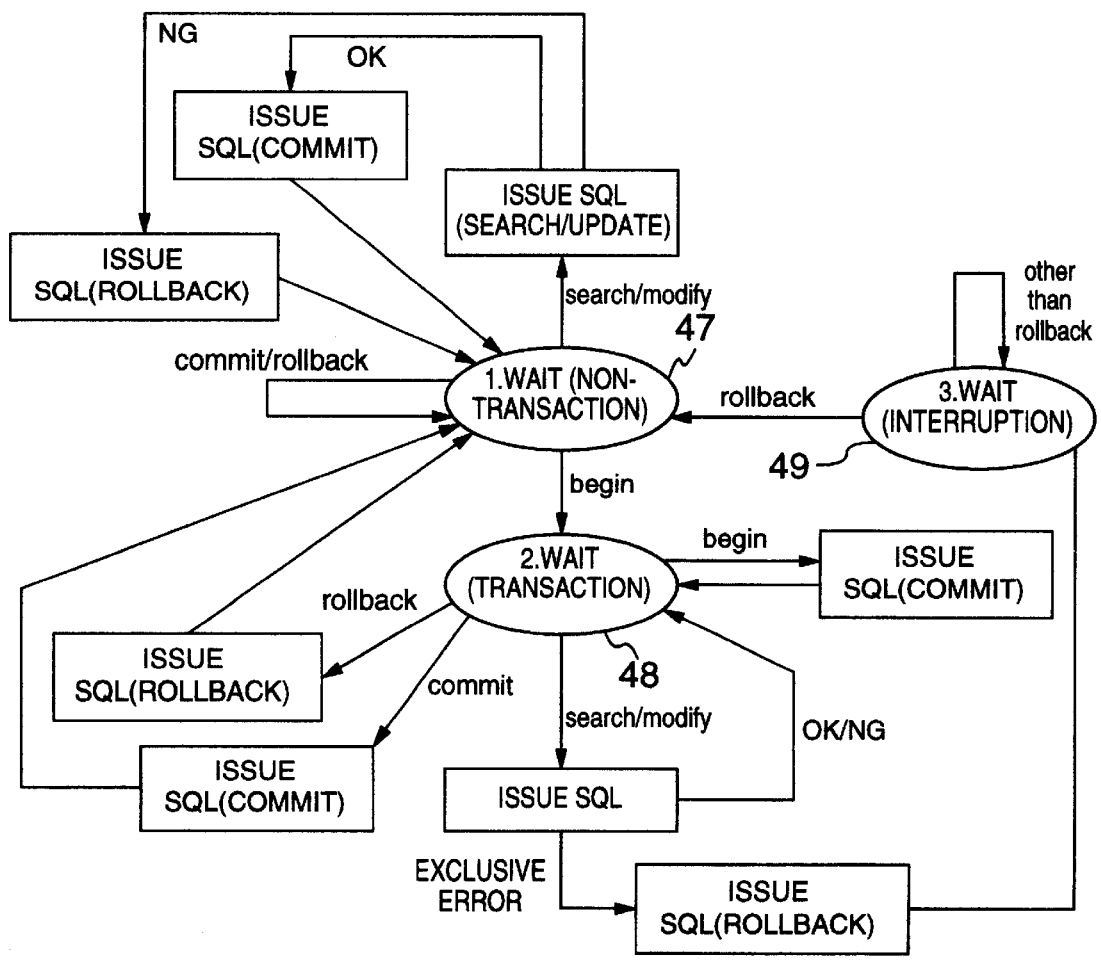
FIG. 14 is a diagram for explaining state transitions in the first embodiment.

FIG. 14 illustrates a state transition diagram for the directory server 1 which implements the directory access method of the first embodiment. Ellipses indicate states possibly taken by the directory server 1, while rectangles indicate processing performed by the directory server 1. Arrows represent state transitions, and each character string added to each arrow represents an event. Specifically, an capital letter string added to each arrow represents an response from the DB 6, while a small letter character string added to each arrow indicates a request from the client 2. An arrow exiting a rectangle is validated upon termination of the processing indicated in the rectangle. The state transition diagram includes a request wait state 47 in a non-transaction phase and request wait states 48, 49 in a transaction phase.

In the non-transaction phase 47, when the server 1 receives a search request 24 and modify requests 25, 26, 27 in accordance with the LDAP illustrated in FIG. 15 from a client 2, the server 1 generates SQL statements which meet the respective requests.

For example, the server 1 translates a search request (Search) of the LDAP into a SELECT statement of the SQL; an addition request (Add) into an INSERT statement; a deletion request (Delete) into a DELETE statement; and a modification request (Modify) into an UPDATE statement, respectively. Parameters associated with the LDAP requests are also translated into SQL parameters. Depending on certain relationship between the LDAP and SQL parameters, one request of the LDAP may be translated into a plurality of SQL statements. Also, each SQL statement is followed by processing for checking the result of executing the statement, i.e., the result of an access to the DB 6.

The server 1 completes a transaction by issuing a COMMIT statement to the DB 6 when an access to the DB 6 has been normally terminated, or by issuing a ROLLBACK statement when an access to the DB 6 has resulted in an error, and then returns again to the non-transaction phase 47. The server 1, upon receipt of begin 29, transits to the transaction phase 48 to begin a transaction.

In the transaction phase 48, when the server 1 receives a search request 24 and modify requests 25, 26, 27 illustrated in FIG. 15 from a client 2, the server 1 generates SQL statements which meet the respective requests, as is the case of the non-transaction phase, accesses the DB 6, and then returns again to the transaction phase 48. Next, when the server 1 receives commit 30 or rollback 31 shown in FIG. 17, the server 1 completes a transaction by issuing a COMMIT statement or a ROLLBACK statement to the DB 6, respectively, and transits to the non-transaction phase 47. Also, when the server 1 receives begin 29, the server 1 normally terminates a transaction by issuing a COMMIT statement to the DB 6, and returns to the transaction phase 48 to begin another transaction. On the other hand, if an exclusive error occurs in an access to the DB 6 during a transaction in the NOWAIT mode, the server 1 abnormally terminates the transaction by issuing a ROLLBACK statement to the DB 6, and then transits to a transaction phase 49.

In the transaction phase 49, the server 1 transits to the non-transaction phase 47 upon receipt of rollback 31.

In the following, the processing performed by the directory server 1 will be explained.

Figure 3:
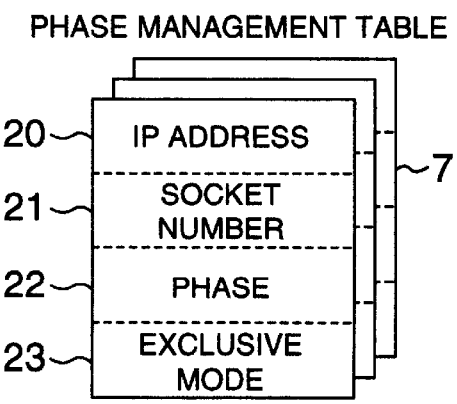
FIG. 3 illustrates a data structure for a phase management table 7.

FIG. 3 illustrates the structure of a phase management table 7 for storing information on processing phases for each connection with the client 2. As illustrated, the phase management table 7 has a matrix structure.

A client 2 delivers each of the access requests illustrated in FIGS. 15, 16, 17 on TCP/IP. A communication packet of TCP/IP includes an IP address and a socket number of an originator or a client 2.

A matrix in the phase management table 7 stores information related to TCP/IP connection with an AP on the client 2, and has matrix elements such as a storage field 20 for storing the IP address of the client 2; a storage field 21 for a socket number; a storage field 22 for storing a current phase; and a storage field 23 for storing the exclusive mode. The phase storage field 22 is set to "1" during a non-transaction phase 47, and to "2" or "3" during a transaction phase 48 or 49, respectively. The value contained in this phase storage field 22 matches the state indicated in an associated ellipse in FIG. 14. The exclusive mode storage field 23 is set to a value of <exclusiveMode0id> which is a parameter of begin 29.

When the protocol analysis unit 4 receives a Bind request for starting a connection, the phase management unit 8 newly reserves a matrix in the phase management table 7, stores the IP address and the socket number of the client 2 included in the request in the IP address storage field 20 and the socket number storage field 21, respectively, and then sets the phase storage field 22 to "1", and initializes the exclusive mode storage field 23 to "NULL" indicative of a blank character string.

Also, when the protocol analysis unit 4 receives an Unbind request for closing a connection, the phase management unit 8 searches the phase management table 7, and deletes a matrix which stores the same values as the IP address and the socket number of the client 2. As illustrated in FIG. 13, if the protocol analysis unit 4 receives an Unbind request during a transaction phase, the transaction processing unit 9 issues a ROLLBACK statement to the DB 6 to discard the transaction prior to the deletion of the matrix.

Figure 4:
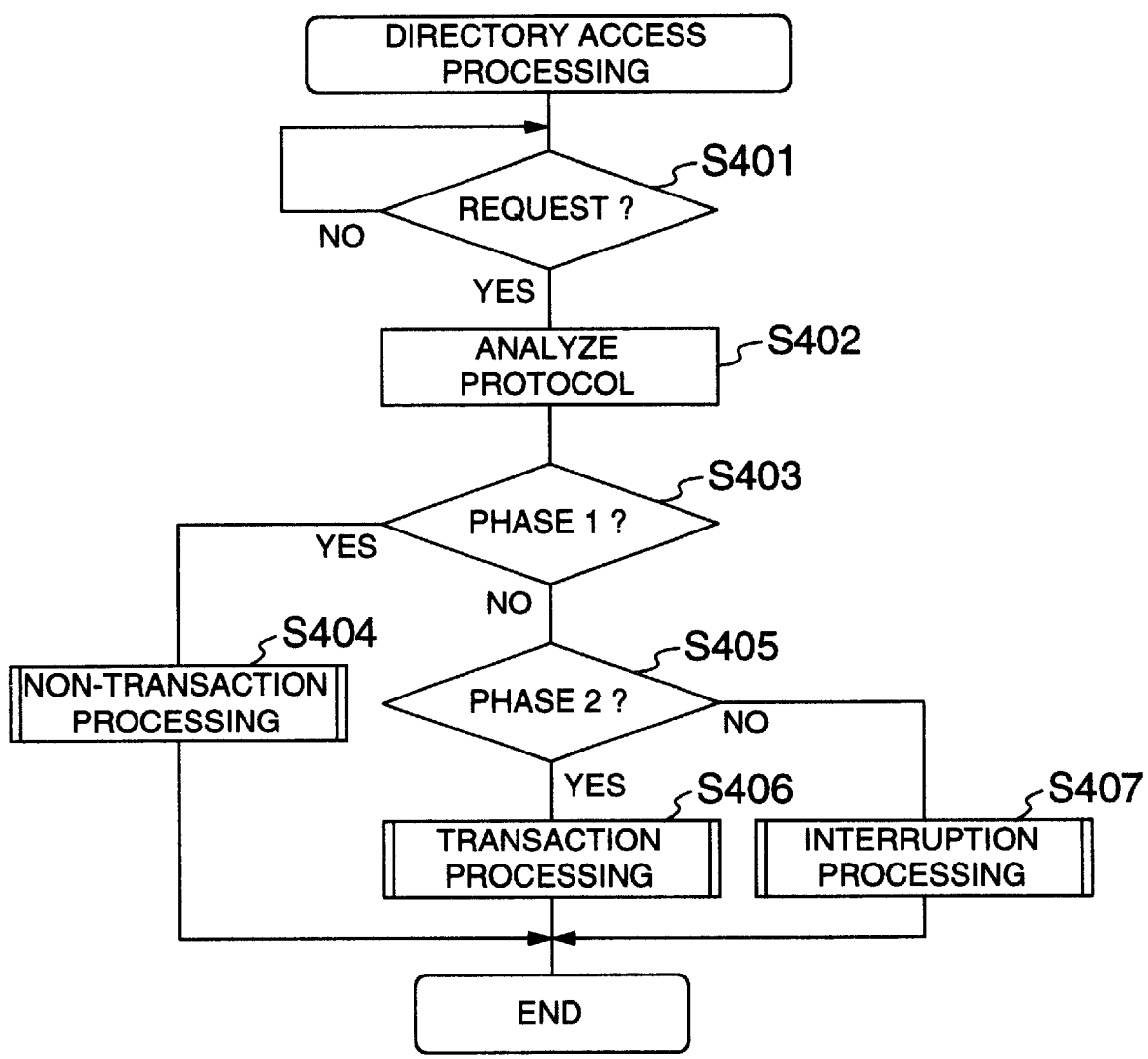
FIG. 4 is a flow diagram for explaining directory access processing in a first embodiment.

FIG. 4 illustrates the processing of the server 1 upon receipt of a request other than a Bind request. Referring specifically to FIG. 4, when the communication control unit 3 receives a request from a client 2 (S401), the protocol analysis unit 4 analyzes the request, and notifies the phase management unit 8 of the contents of a header portion in a request packet (S402). The phase management unit 8, upon receiving the notification, searches the phase management table 7 for a matrix which stores the same values as the IP address and the socket number of the client 2 included in the request, and confirms the value in the phase storage field 22 (S403 or S405). The phase management unit 8 executes non-transaction processing (S404) when the value stored in the phase storage field 22 is "1", transaction processing (S406) when "2", and interruption processing (S407) when "3".

Figure 5:
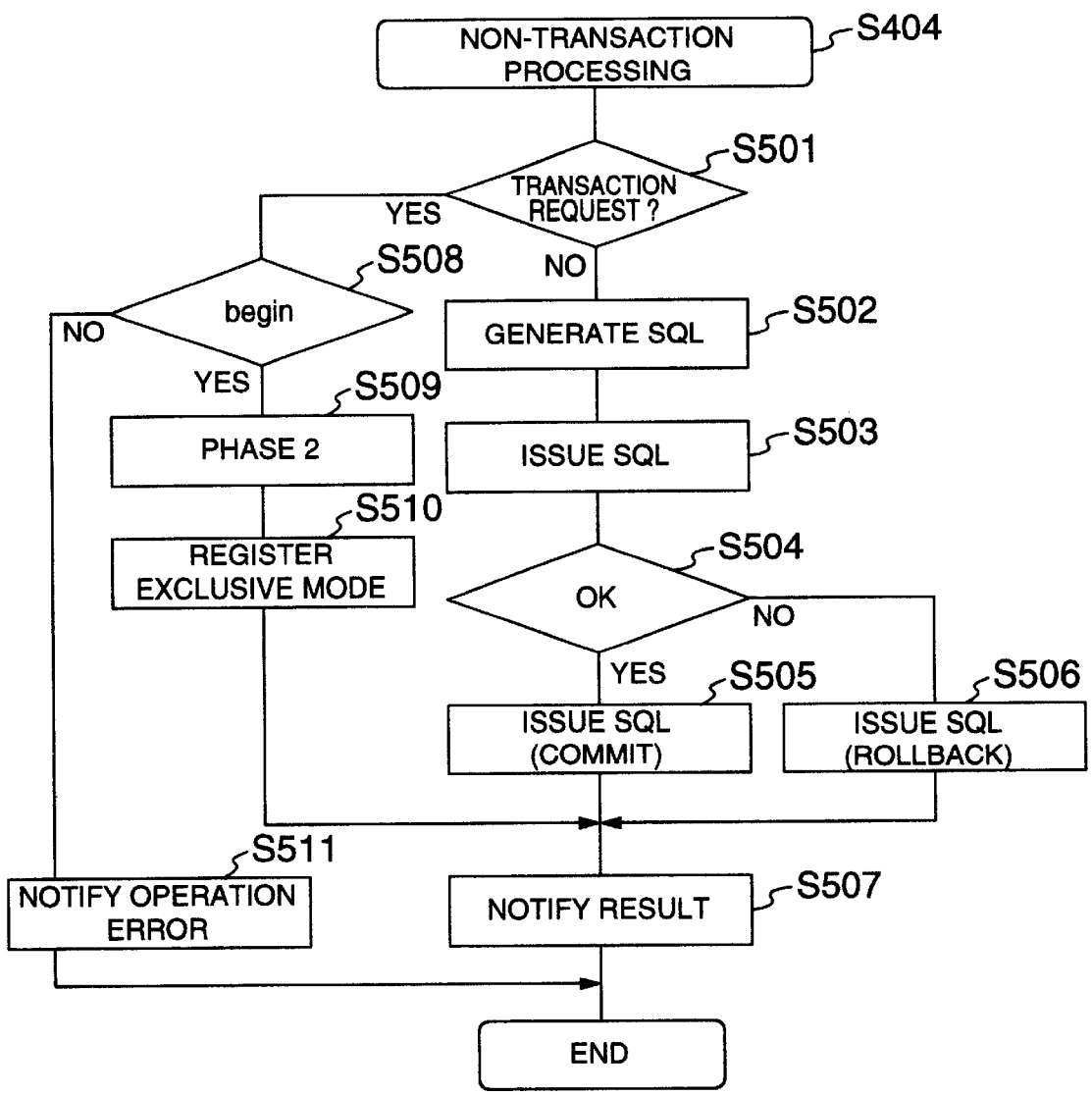
FIG. 5 is a flow diagram for explaining non-transaction processing in first and second embodiments.

FIG. 5 is a flow chart illustrating the non-transaction processing (S404) in FIG. 4.

In the non-transaction phase 47, the phase management unit 8 confirms the contents of an access request notified from the protocol analysis unit 4 (S501), and requests the non-transaction processing unit 5 to undertake the processing when the access request does not involve any of the transaction requests shown in FIG. 17, i.e., when the access request is any of those shown in FIG. 15. The non-transaction processing unit 5, upon receipt of the request, generates SQL statements such as SELECT, INSERT and so on which satisfy the request (S502), issues these SQL statements to the DB 6 (S503), and waits for the processing to terminate (S504). The DB 6 searches for or modifies directory data in accordance with the received SQL statements, and returns the processing result to the non-transaction processing unit 5. When the search or modify processing in the DB 6 is normally terminated at S504, the non-transaction processing unit 5 normally terminates the transaction by issuing a COMMIT statement to the DB 6 (S505). On the other hand, if the search or modify processing fails in the DB 6, the non-transaction processing unit 5 abnormally terminates the transaction by issuing a ROLLBACK statement to the DB 6 (S506). Finally, the phase management unit 8 returns the processing result of the access request to the client 2 through the communication control unit 3 (S507).

At S501, if the request notified from the protocol analysis unit 4 involves any of the transaction requests shown in FIG. 17, the processing flow proceeds to S508. If the request is begin 29 at S508, the phase management unit 8 sets "2" (transaction processing) in the phase storage field 22 in the phase management table 7 in order to transit to the transaction phase 48 (S509), and registers the value of <exclusiveMode0id>, which is a parameter of begin 29, in the exclusive mode storage field 23 (S510). Then, the phase management table 8 returns a normal termination to the client 2 as the processing result (S507). On the other hand, if the request is other than begin 29 at S508, the phase management unit 8 regards the request as a sequence error, and therefore returns an operation error to the client 2 as the processing result (S511).

Figure 6:
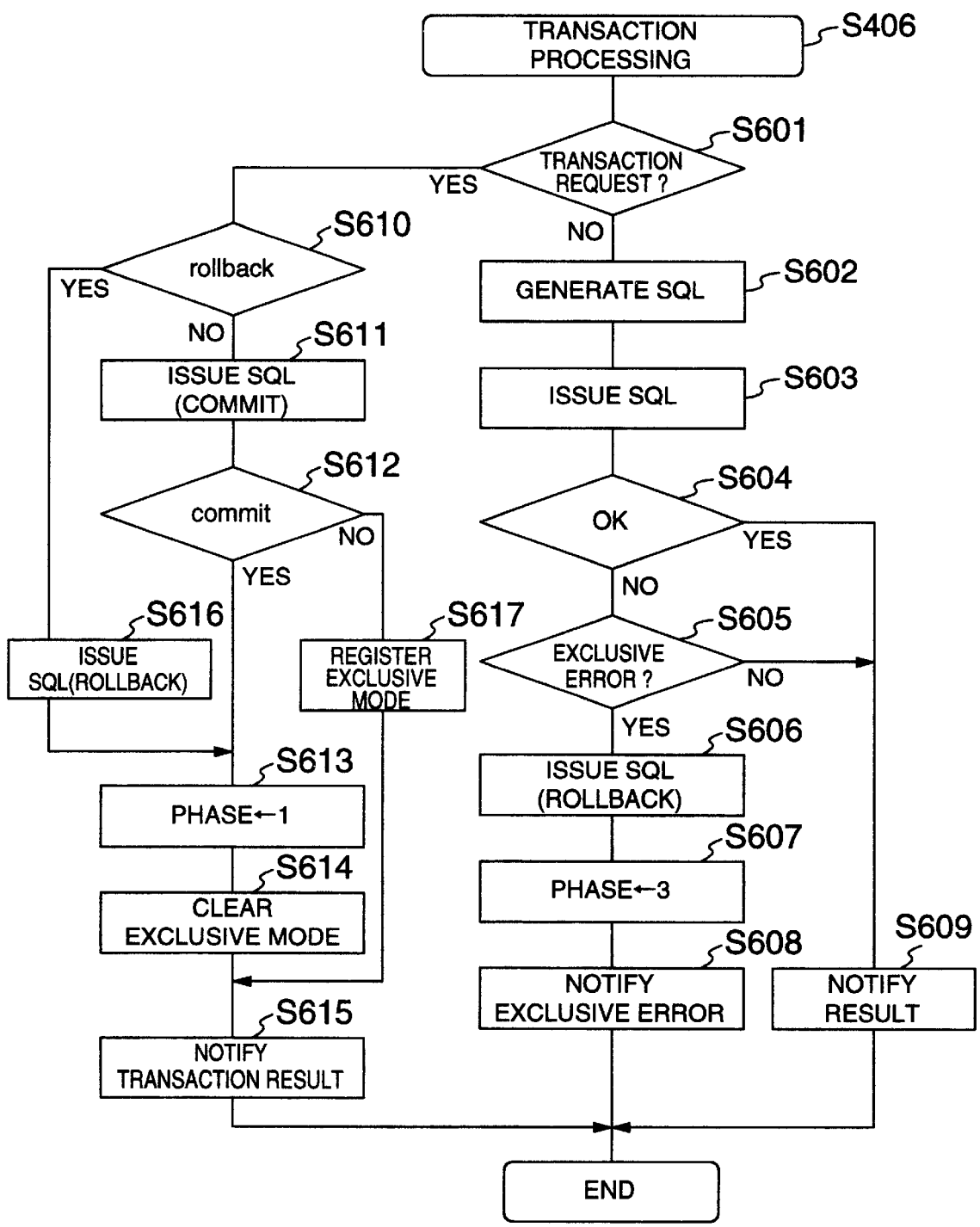
FIG. 6 is a flow diagram for explaining transaction processing in the first embodiment.

FIG. 6 is a flow chart illustrating the transaction processing (S406) in FIG. 4.

In the transaction phase 48, the phase management unit 8 confirms the contents of a request notified from the protocol analysis unit 4 (S601), and notifies the transaction processing unit 9 of the contents of the request and the value in the exclusive mode storage field 23 in the phase management table 7 and requests the transaction processing unit 9 to undertake the processing when the access request does not involve any of the transaction requests shown in FIG. 17, i.e., when the access request is any of those shown in FIG. 15. The transaction processing unit 9, upon receipt of the request, generates SQL statements such as SELECT, INSERT and so on which satisfy the request (S602), and issues these SQL statements to the DB 6 (S603). In this event, the transaction processing unit 9 confirms the notified exclusive mode, and instructs the DB 6, when in the WAIT mode, to wait until a lock is released if the access request contends with that of another AP. On the other hand, if in the NOWAIT mode, the transaction processing unit 9 instructs the DB 6 to immediately return the control to the requesting AP as an exclusive error if the access request contends with that of another AP. Simultaneously, the transaction processing unit 9 instructs the DB 6 to apply an exclusive lock if the received access request is Search 24. The DB 6 searches for or modifies directory data in accordance with the received SQL statements, and returns the processing result. When the search or modify processing is normally terminated in the DB 6 at S604, the phase management unit 8 returns a normal termination to the client 2 through the communication control unit 3 as the processing result of the access request (S609). On the other hand, if the search or modify processing fails in the DB 6, and if the failure is not caused by an exclusive error (S605), the phase management unit 8 returns a processing failure to the client 2 as a result (S609). On the other hand, if the failure is caused by an exclusive error at S605, the transaction processing unit 9 abnormally terminates the transaction by issuing a ROLLBACK statement to the DB 6 (S606). Next, the phase management unit 8 sets "3" in the phase storage field 22 in the phase management table 7 (S607) in order to transit to a transaction phase 49, and then returns an exclusive error to the client as the processing result (S608).

Back to S601, if a request notified from the protocol analysis unit 4 is any of the transaction requests shown in FIG. 17, the processing flow proceeds to S610. If the request is other than rollback 31 at S610, i.e., if the request is begin 29 or commit 30, the phase management unit 8 requests the transaction processing unit 9 to issue a COMMIT statement in order to normally terminate the transaction (S611). Further, if the request is commit 30 (S612), the phase management unit 8 sets "1" in the phase storage field 22 in the phase management table 7 in order to transit to the non-transaction phase 47 (S613), and registers "NULL" indicative of a blank character string in the exclusive mode storage field 23 (S614), and then returns the result of the transaction processing to the client 2 (S615). On the other hand, if the request is begin 29 at S612, the phase management unit 8 registers the value of <exclusiveMode0id>, which is a parameter of begin 29, in the exclusive mode storage field 23 (S617), and the processing flow thereafter proceeds to S615. Further, if the request is rollback 31 at S610, the phase management unit 8 requests the transaction processing unit 9 to issue a ROLLBACK statement (S616) in order to abnormally terminate the transaction, followed by the processing flow proceeding to S613.

Figure 7:
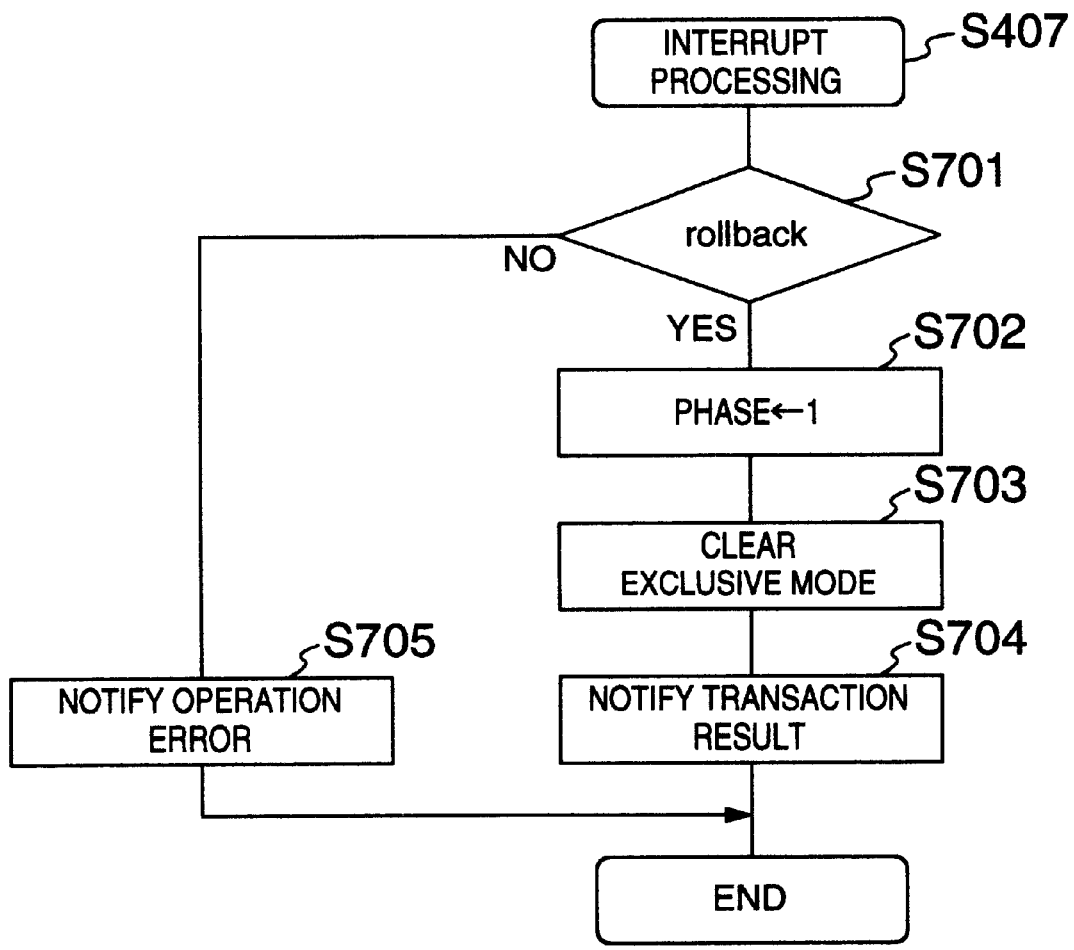
FIG. 7 is a flow diagram for explaining interruption processing in the first embodiment.

FIG. 7 is a flow chart illustrating the interruption processing (S407) in FIG. 4.

In the transaction phase 49, when a request notified from the protocol analysis unit 4 is rollback 31 (S701), the phase management unit 8 sets "1" in the phase storage field 22 in the phase management table 7 in order to transit to the non-transaction phase 47 (S702), registers "NULL" indicative of a blank character string in the exclusive mode storage field 23 (S703), and then returns the result of the transaction processing to the client 2 (S704). On the other hand, if the request is other than rollback 31 at S701, the phase management unit 8 assumes a sequence error, and returns an operation error to the client 2 as the processing result (S705).

(2) Second Embodiment

Next, a second embodiment of the present invention will be described. The second embodiment differs from the first embodiment in the processing for the exclusive error of SQL.

According to the first embodiment, if an exclusive error is produced because a directory entry to be accessed by an AP has already been locked by another AP in a transaction phase of the NOWAIT mode as illustrated in FIG. 12, the transaction 43 is automatically terminated as abnormal. This is a specification due to functional limitations of the DB 6. Many of general-purpose relational database management systems cannot continue a transaction when an exclusive error occurs due to such multiple lock, so that the transaction should be explicitly concluded with a ROLLBACK statement.

The second embodiment provides a directory access method which uses a DB 6 that can continue a transaction even if an exclusive error occurs due to multiple lock.

In the following, description will be focused only on differences between the second embodiment and the first embodiment.

Figure 20:
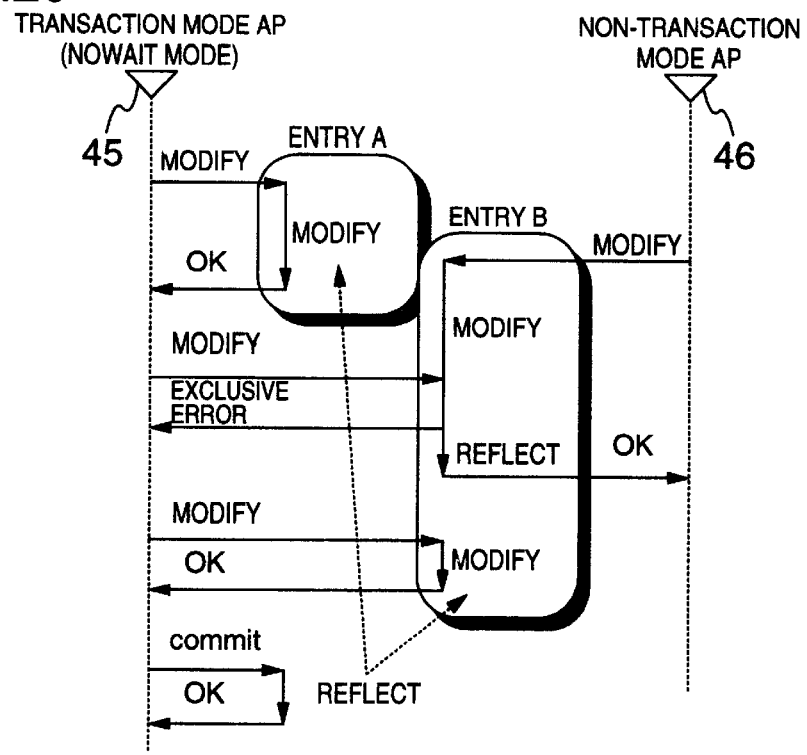
FIG. 20 is a flow diagram for explaining a transaction operation in a NOWAIT mode in the second embodiment.
Figure 21:
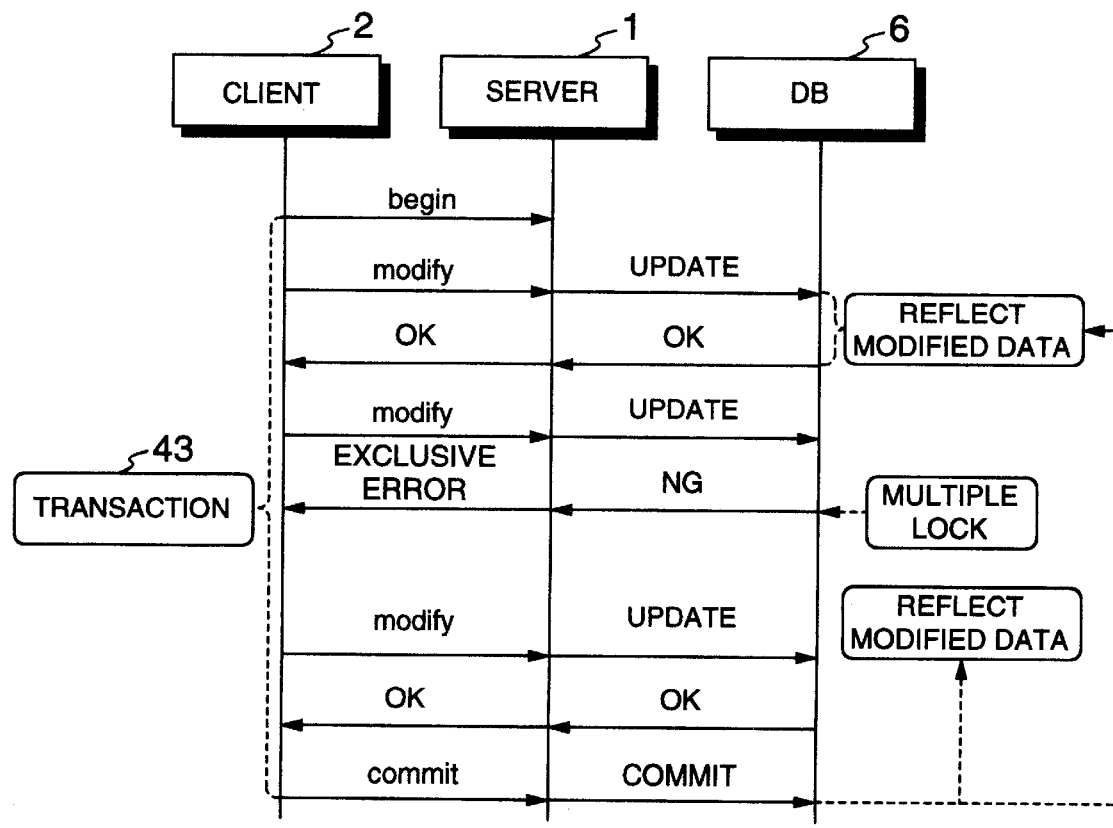
FIG. 21 is a diagram for explaining a communication sequence when an exclusive error occurs in the second embodiment.

FIG. 20 illustrates the operation in a NOWAIT mode, and FIG. 21 illustrates a communication sequence. These figures correspond to FIGS. 9, 12 in the first embodiment, respectively.

When an AP 45 attempts to modify an entry B during transaction processing in the NOWAIT mode, an exclusive error is returned as an error code, and the control is returned to the AP 45 because the entry B is being modified by an AP 46. The AP 45, which implements the second embodiment, retries to modify the entry B, for example, after the lapse of a fixed period, if the AP 45 detects the exclusive error. The server 1 processes a request issued by the AP 45 to modify the entry B, if the AP 46 has terminated the modification to the entry B and the entry B has been released from the lock.

According to the first embodiment, when an exclusive error occurs due to multiple lock, each transaction should be retried. In contrast, according to the directory access method of the second embodiment, a retry is only required to modify the entry B without discarding the previously performed processing for updating an entry A, thus improving the operability from a viewpoint of the AP.

Figure 22:
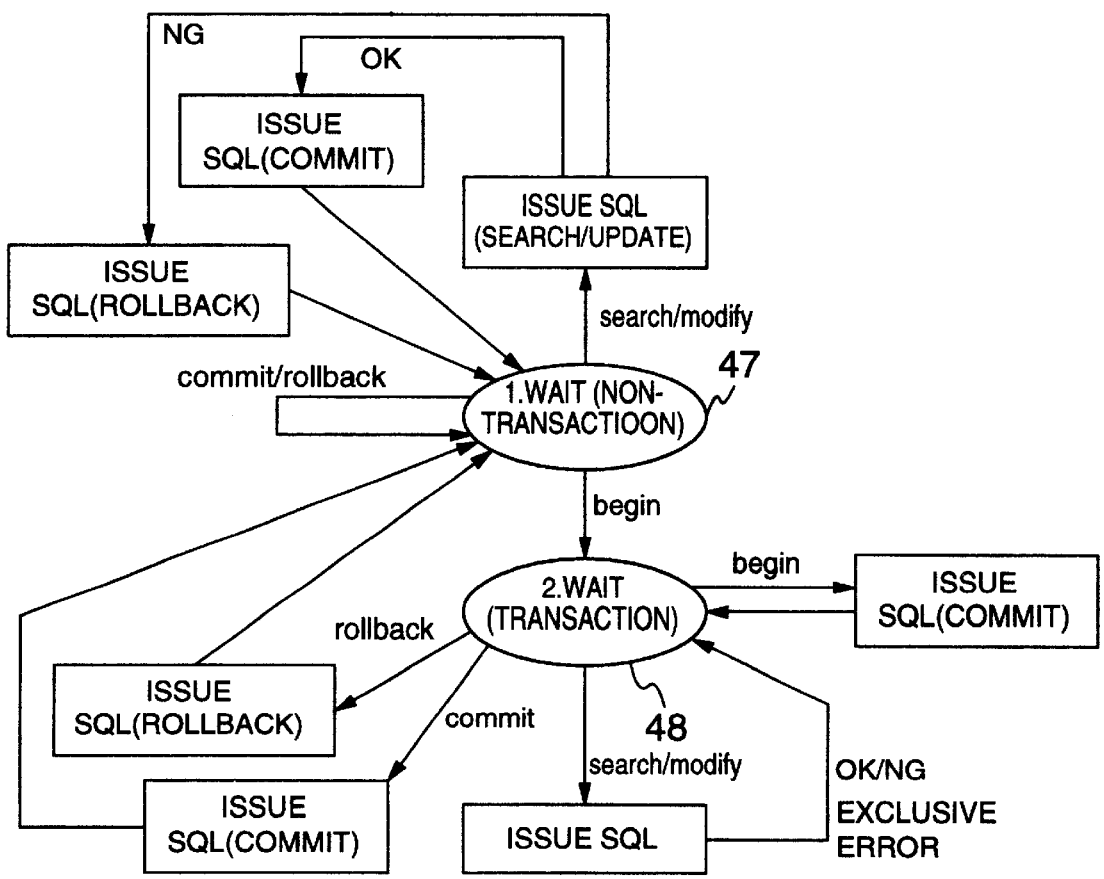
FIG. 22 is a diagram for explaining state transitions in the second embodiment.

FIG. 22 is a state transition diagram for the directory server 1 which implements the directory access method of the second embodiment, and corresponds to FIG. 14 in the first embodiment. In the second embodiment, the transaction phase 49 is not required.

In the transaction phase 48, upon receipt of the search request 24 and the modify requests 25, 26, 27 shown in FIG. 15, the server 1 generates SQL statements which meet the requests, accesses the DB 6, and again returns to the transaction phase 48. If an exclusive error occurs while the DB 6 is being accessed during a transaction in the NOWAIT mode, the server 1 returns to the transaction phase 48.

In the following, the processing in the directory access method of the second embodiment will be explained with reference to FIGS. 18, 19.

Figure 18:
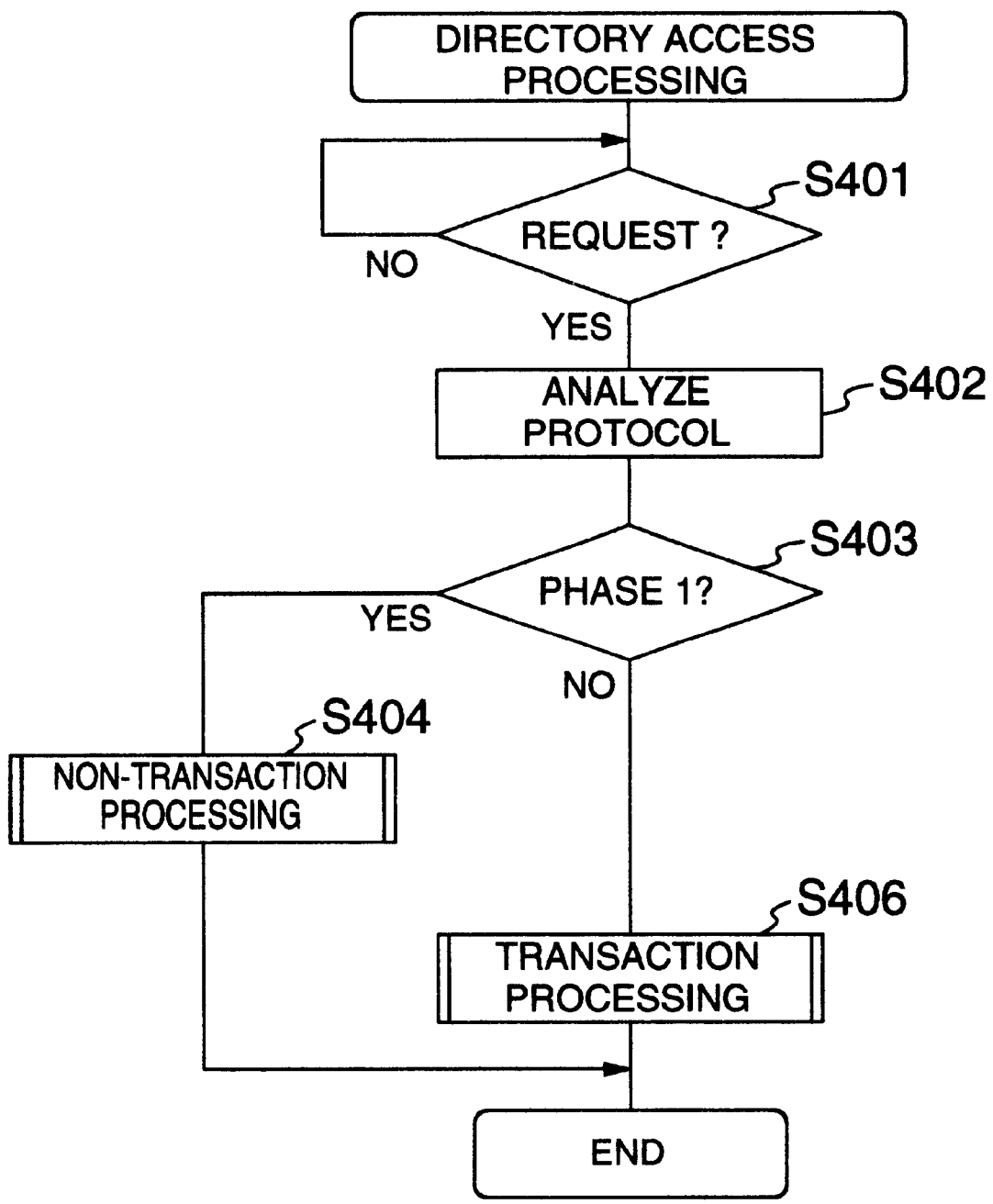
FIG. 18 is a flow diagram for explaining directory access processing in the second embodiment.
Figure 19:
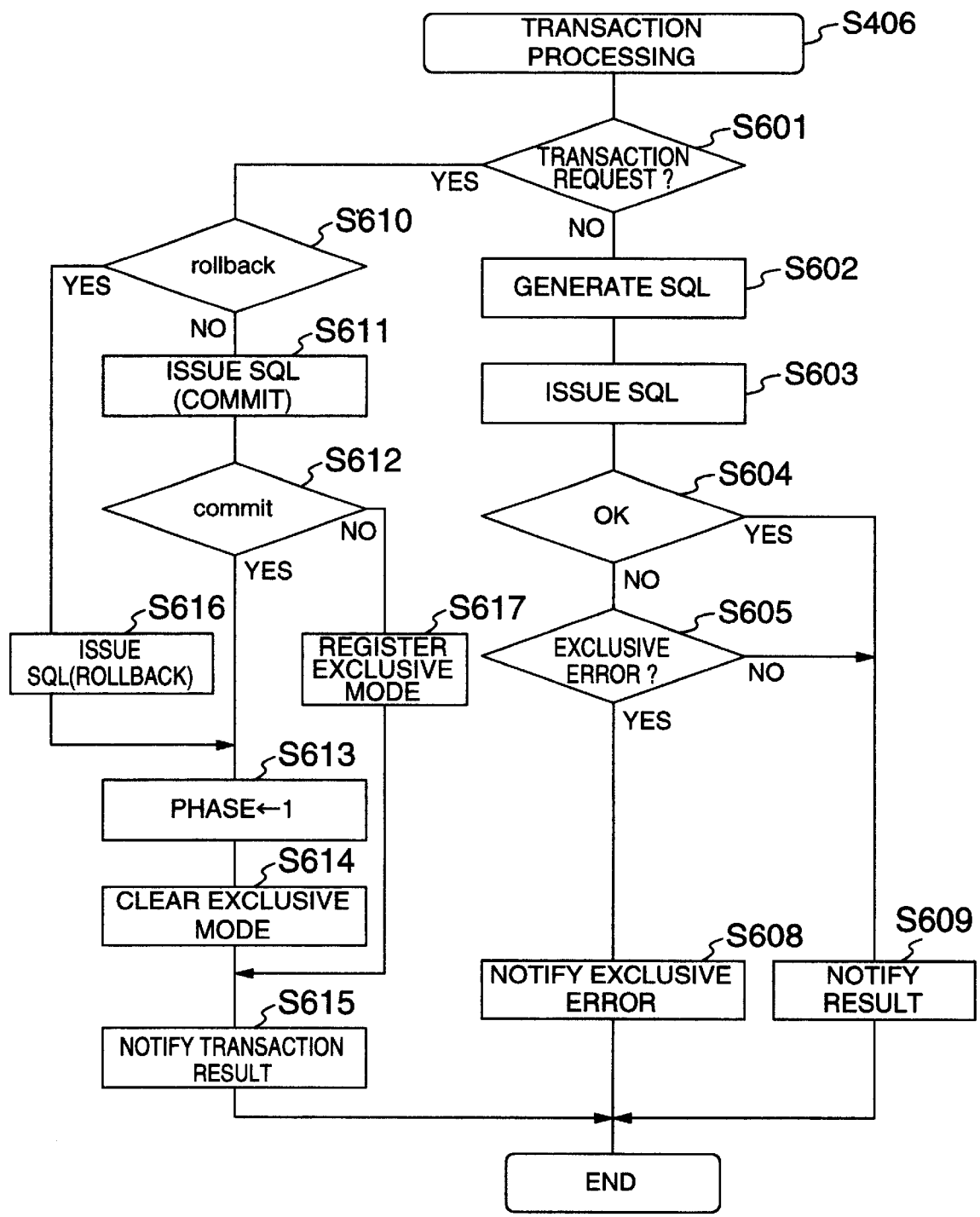
FIG. 19 is a flow diagram for explaining transaction processing in the second embodiment.

FIGS. 18, 19 are flow charts illustrating the operation of the server 1 upon receipt of a request other than a Bind request, and correspond to FIGS. 4, 6 in the first embodiment, respectively.

In FIG. 18, the phase management unit 8 executes the non-transaction processing (S404) when the value stored in the phase storage field 22 is "1" and the transaction processing (S406) when "2".

At S605 in FIG. 19, if search or modify processing fails in the DB 6 due to an exclusive error, the exclusive error is returned to the client 2 as the processing result (S608). The client 2 retries the processing after the lapse of a fixed time.

In the second embodiment, a transaction can be continued even if an exclusive error occurs due to multiple lock, thereby improving the operability.

(3) Modifications

To prepare for suddenly interrupted processing due to power interruption, user's erroneous manipulations, erroneous operations of the information processing unit itself or a program, and so on while an AP is successively updating a plurality of directory information items, the server 1 may be provided with a client monitoring means and a timer monitoring means (not shown) to detect any abnormality in the client 2. The timer monitoring means may be provided in the DB 6 instead of the server 1. In this case, the DB 6 notifies the server 1 of abnormality in the client 2, so that the server 1 can perform similar processing.

When the server 1 detects abnormality in the client 2 while a transaction is being processed, the transaction processing unit 9 issues a ROLLBACK statement to the DB 6 to discard the transaction. Then, the phase management unit 8 searches the phase management table 7 for a matrix having stored therein the same values as the IP address and the socket number of the client 2, and deletes this matrix.

Also, as illustrated in FIG. 1, the directory service in the respective embodiments has a three-layer structure including the client 2, the directory server 1 and the DB 6. It should be understood that this structure is employed to facilitate the explanation of transmission and reception of a sequence between the respective layers. The DB 6 for storing directory information is indispensable for the server 1. Actually, the directory server 1 may contain the DB 6 as one functional element thereof, in which case similar effects can be produced.

Further, as illustrated in FIGS. 5, 6 and FIG. 19, the non-transaction processing unit 5 and the transaction processing unit 9 have some operations which include common processing. Therefore, the non-transaction processing unit 5 and the transaction processing unit 9 may be integrated into a single unit. In this case, when the phase management unit 8 passes an access request from the client 2 to the integrated unit, the phase management unit 8 notifies the integrated unit whether a current processing phase is a non-transaction phase or a transaction phase. Alternatively, the integrated unit itself may reference the phase management table 7 so as to determine whether an access request passed from the phase management unit 8 should be processed in a non-transaction phase or a transaction phase.

The foregoing embodiments have been described on the assumption that one application will never process two or more transactions simultaneously. However, a plurality of transactions can be processed simultaneously by exchanging information for identifying transactions between a client and a server, adding an entry for identifying such information in the phase management table, and managing the information.

Also, while the foregoing embodiments have been described for a specific example in which the LDAP and SQL are utilized, the present invention may also utilize any protocol and database operation language as long as they have similar functionalities.

What is claimed is:

1. A directory server connected to at least one client through a network, comprising:
   non-transaction processing means for operating in a non-transaction phase by performing access-processing and validate-processing for each access request from the client;
   transaction processing means for operating in a transaction phase by performing access-processing according to at least one access request from the client and performing validate-processing for the access-processing when receiving a request for indicating a termination of a transaction from the client, and
   phase management means for moving a processing phase to said transaction phase processed by the transaction processing means when receiving a request for indicating a beginning of the transaction from the client during said non-transaction phase processed by the non-transaction processing means, and moving said processing phase to said non-transaction phase after performing validate-processing when receiving a request for indicating a termination of the transaction from the client during processing by the transaction processing means.

2. A directory server according to claim 1, wherein said phase management means passes to said transaction processing means access requests which have been received from reception of a request for indicating the beginning of a transaction to reception of a request for indicating a normal or abnormal termination of the transaction.

3. A directory server according to claim 2, wherein said phase management means performs a validate-processing and retains said processing phase in the transaction phase when receiving another request for indicating a beginning of the transaction during the transaction phase.

4. A directory server according to claim 1, wherein said phase management means passes to said non-transaction processing means access requests other than those surrounded by a request for indicating the beginning of a transaction and a request for indicating a normal or abnormal termination of the transaction.

5. A directory server according to claim 1, further comprising:
   a phase management table for managing said processing phase for each of the clients.

6. A directory server according to claim 5, wherein said phase management table stores an exclusive mode for indicating whether a wait state is maintained until the directory information is released from a locked state or an error is immediately returned when directory information is locked due to multiple lock, and said transaction processing means determines how to take action with the multiple lock, when occurring, in accordance with said exclusive mode.

7. A directory server according to claim 6, wherein said transaction processing means abnormally terminates a transaction under processing, when said exclusive mode stored in said phase management table indicates an immediate error and the multiple lock occurs.

8. A directory server according to claim 6, wherein said transaction processing means continues a transaction under processing when said exclusive mode stored in said phase management table indicates a waiting and the multiple lock occurs.

9. A direction server according to claim 1, wherein said access-processing comprises one of modify and search.

10. A directory server according to claim 1, further comprising means for causing said directory server to bidirectionally transit between said non-transaction phase and said transaction phase.

11. A directory server according to claim 10, wherein said transition means causes said directory server to transit to a transaction phase when a request for indicating the beginning of transaction is received and to a non-transaction phase when a request for indicating a normal or abnormal termination of the transaction is received.

12. A directory server according to claim 10, wherein said transition means causes said directory server to transit to a new transaction phase when a request for indicating the beginning of a new transaction is received during a current transaction phase.

13. A network system comprising:
   a directory server including a database for storing directory information; and
   at least one client connected to said directory server through a network,
   said client having means for defining a transaction; and
   said directory server including:
      non-transaction processing means for operating in a non-transaction phase by performing access-processing and validate-processing for each access request from the client;
      transaction processing means for operating in a transaction phase by performing access-processing according to at least one access request from the client and performing validate-processing for the access-processing when receiving a request for indicating a termination of said transaction from the client; and phase management means for moving a processing phase to said transaction phase processed by the transaction processing means when receiving a request for indicating a beginning of the transaction from the client during said non-transaction phase processed by the non-transaction processing means, and moving said processing phase to non-transaction phase after performing validate-processing when receiving a request for indicating a termination of the transaction from the client during processing by the transaction processing means.

14. A network system according to claim 13, wherein said access-processing comprises one of modify and search.

* * * * *

UNITED STATES PATENT AND TRADEMARK OFFICE
CERTIFICATE OF CORRECTION

PATENT NO.     : 6,377,948 B2
DATED          : April 23, 2002
INVENTOR(S)    : Satoshi Kikuchi et al.

It is certified that error appears in the above-identified patent and that said Letters Patent is hereby corrected as shown below:

<u>Title page,</u>
Item [*] Notice, should read as follows:
-- This patent issued on a continued prosecution application filed under 37 C.F.R. 1.53(d), and is subject to the twenty year patent term provisions of 35 U.S.C. 154(a)(2). Subject to any disclaimer, the term of this patent is extended or adjusted under 35 U.S.C. 154(b) by 0 days. --

Signed and Sealed this

Fifteenth Day of July, 2003

JAMES E. ROGAN
*Director of the United States Patent and Trademark Office*